Aug. 15, 1961 H. W. BOYLAN 2,996,255
AUTOMOTIVE HEATING SYSTEMS
Filed Aug. 5, 1958 6 Sheets-Sheet 1

INVENTOR.
Henry W. Boylan
BY George E. Johnson
ATTORNEY

INVENTOR.
Henry W. Boylan
BY George E. Johnson
ATTORNEY

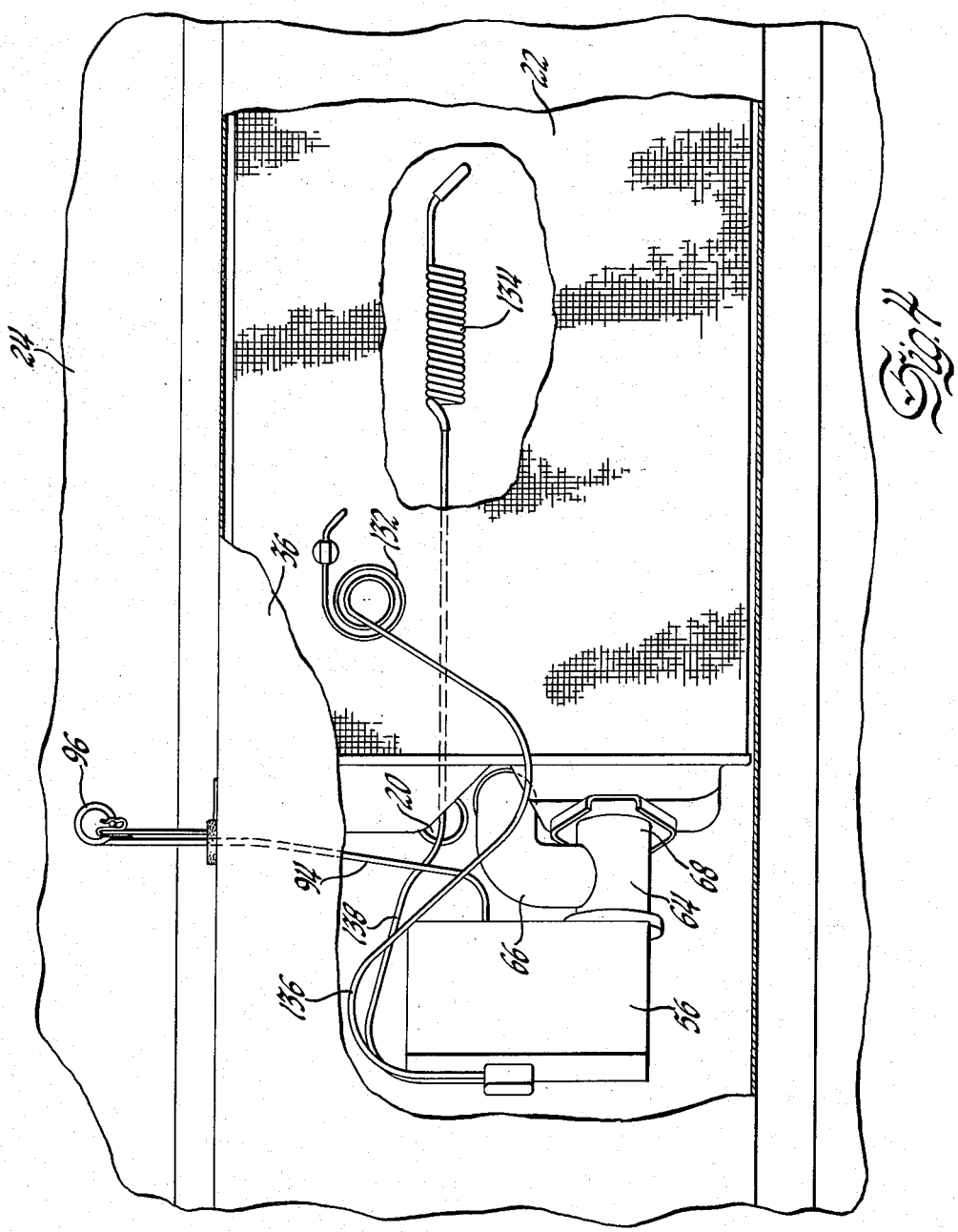

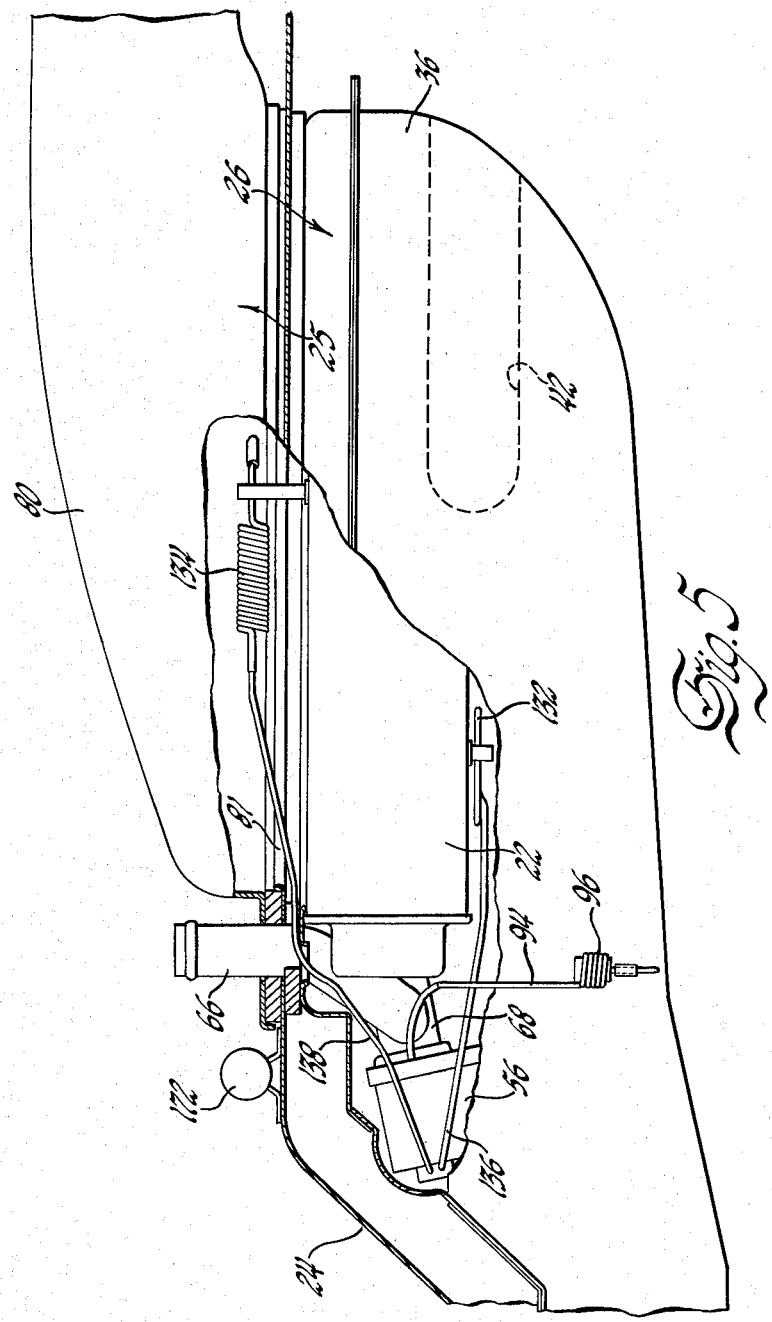

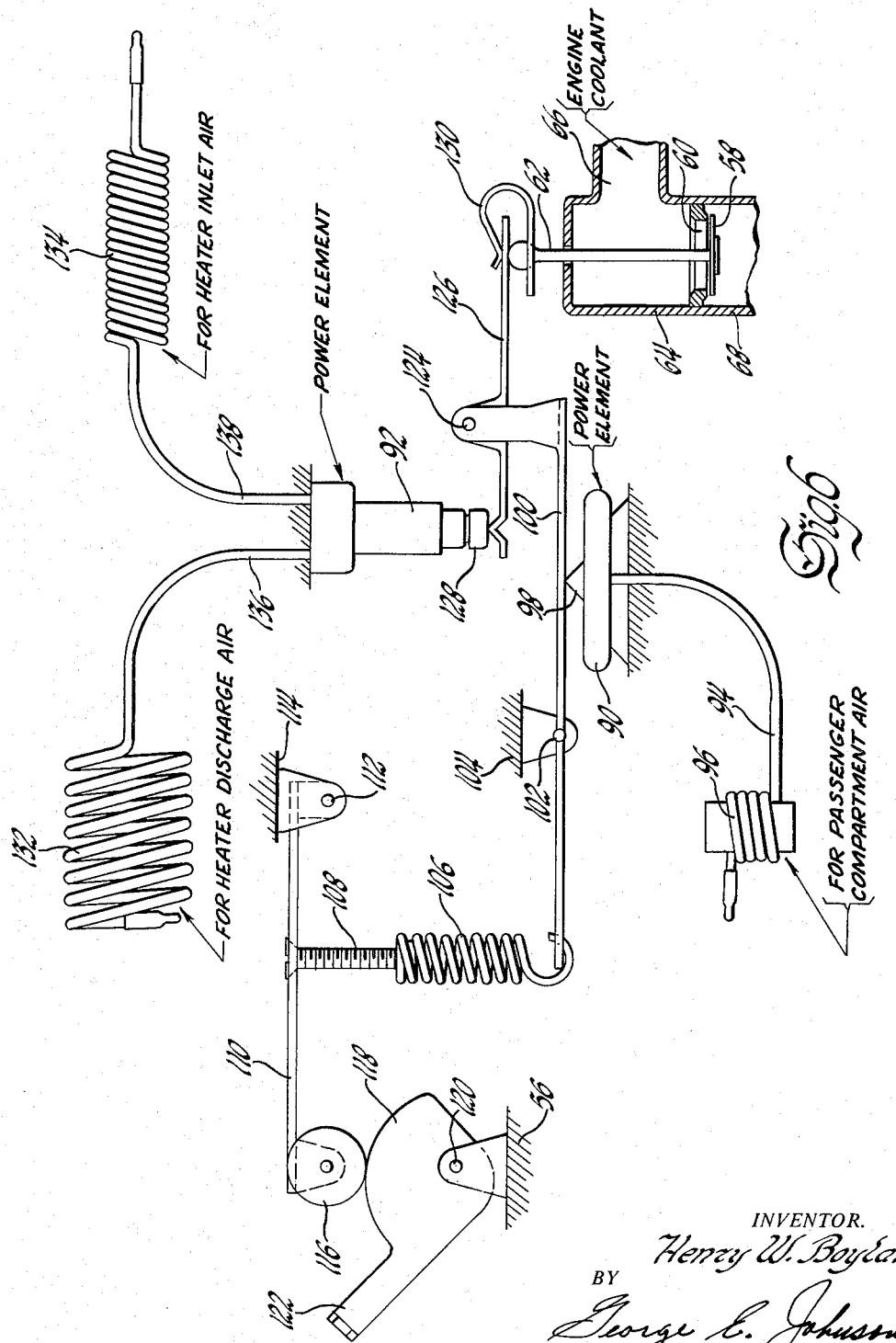

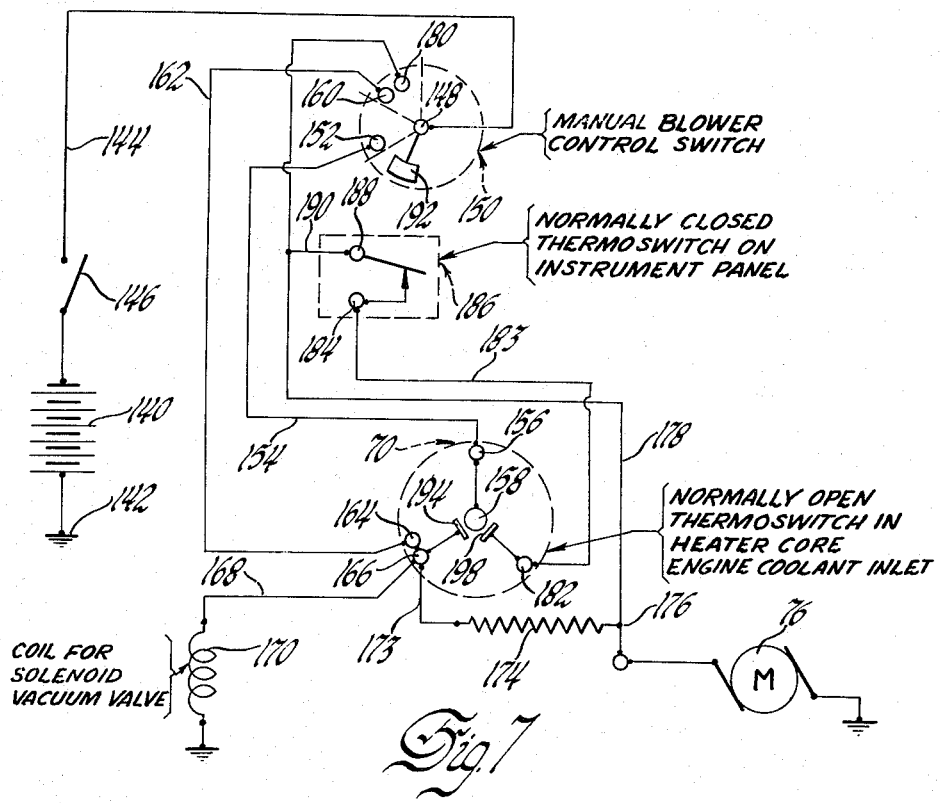
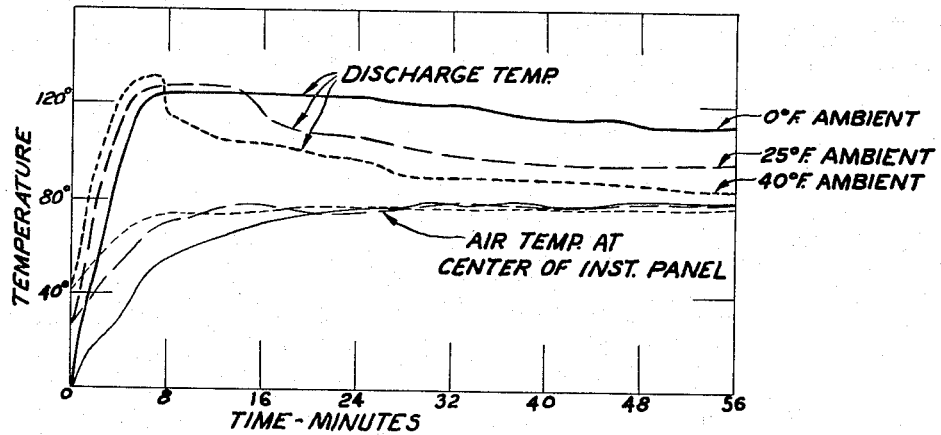

United States Patent Office 2,996,255
Patented Aug. 15, 1961

2,996,255
AUTOMOTIVE HEATING SYSTEMS
Henry W. Boylan, Flint, Mich., assignor to General Motors Corporation, Detroit, Mich., a corporation of Delaware
Filed Aug. 5, 1958, Ser. No. 753,257
1 Claim. (Cl. 237—8)

This invention relates to systems for supplying heat and more particularly to automotive heating systems which are automatically controlled for the comfort and convenience of passengers.

In providing systems capable of properly and satisfactorily heating the passenger compartments of automobiles, three factors must be considered as of primary importance—the temperature of the air being introduced into the compartment, the temperature of the passenger compartment or the surfaces defining that compartment (body, seats, floor and roof), and the ambient temperature. Modern car heaters are preferably so used as to heat all outside air with no recirculated air. This is for the purpose of improving window defogging and freeing the passenger compartment of odors. Heretofore, variations in the three factors or temperatures above mentioned has made proper control difficult and often impossible particularly during engine or passenger compartment warm-up periods. The temporary and, of course, prolonged introduction of too hot or too cold air should be avoided. The temperature of air discharged into the passenger compartment cannot be relied upon as the single factor dominating the heat control as a thoroughly chilled car should be supplied with more heat during a warm-up period than is required subsequent to that period when stabilized conditions should be maintained. This requires adjustment of the control to suit each particular situation and, as the ambient temperature changes, different air discharge temperatures are required to maintain the desired passenger compartment temperature. In order to avoid some of these adjustments, attempts have been made heretofore in which multiple temperature sensitive devices are employed with a closed expansible fluid chamber to affect the heat control. These have been operable insofar as somewhat improving the effectiveness of the control after the warm-up period but they have not reduced the warm-up period or served satisfactorily to stabilize the passenger compartment temperature at any desired setting.

It is an object of the present invention to provide an improved heating system for an automotive vehicle which system is capable of attaining passenger compartment temperature comfort in a minimum of time and maintaining it despite variations in weather or other conditions which may be encountered.

To this end, a feature of the present invention is a heating system including multiple temperature sensitive devices operatively connected with multiple power elements associated with a control valve for a heat exchanger, these devices and power elements being so arranged as to compensate for variations in the three factors above referred to—the temperature of air being discharged into the passenger compartment, the temperature of that compartment, and the ambient temperature, with the power element affected by the temperature of the compartment being capable of counteracting the effectiveness of the other factors during warm-up periods. Another feature is a system in which blower speed and heater-air-discharge temperature may be increased automatically to reduce the warm-up period.

The above and other important features of the invention will now be described in detail in the specification and then pointed out more particularly in the appended claim.

In the drawings:
FIG. 1 is a phantom plan view of the forward portion of an automobile with heating and defrosting apparatus installed and diagrammatically shown in full lines;

FIG. 4 is an elevation view, with portions broken away, of a portion of the heating system looking forwardly in the vehicle and within the passenger compartment, the view being drawn to a still larger scale;

FIG. 5 is a plan view of the structure shown in FIG. 4 but including a portion of the vehicle fire wall and part of a housing forward of that wall, parts being broken away better to illustrate the construction;

FIG. 6 is a diagrammatic representation of the system for controlling the heating system and including thermosensitive devices and power elements for actuating a heater core valve;

Figure 1:
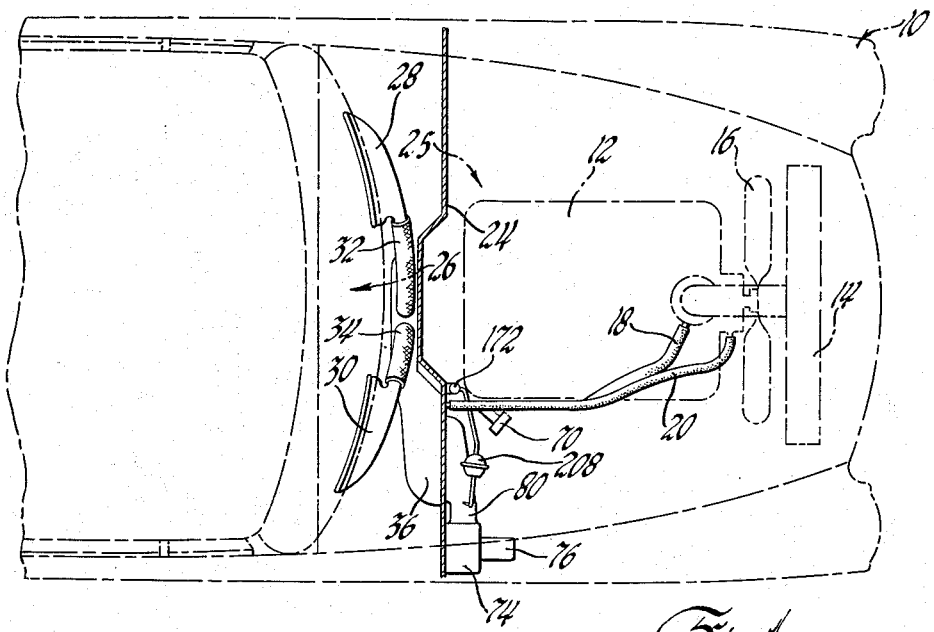

FIG. 7 is a diagrammatic showing of the electrical system for controlling the heating system blower and a valve admitting outside air; and FIG. 8 is a view of curves representing time plotted against temperature with reference to air at the center of the instrument panel and as discharged from the heating system heater core and showing actual results achieved in the use of the present invention in a particular installation.

It is conventional in modern automobiles to throttle the flow of engine coolant through the passenger compartment heater core as a convenient manner of regulating the passenger compartment temperature. This mode of control by way of a coolant valve is employed and utilized in the present disclosure and is supplemented in the teaching of the present invention not only by an improved actuation of the valve but also by a control of the blower speed whereby more or less air may automatically be introduced into the passenger compartment when desired. In order to achieve passenger comfort, it is essential first to introduce heated air to the passenger compartment after the engine is warm and while the compartment is cold and then to decrease the temperature of the heated air entering the compartment as the general temperature of the compartment approaches that required. The B.t.u. content of the air during the warm-up period is obviously influenced by blower speed as well as by the control of the heater core valve. The present invention automatically regulates blower speed and the heater core valve position effectively to bring about a quick warm-up of the passenger compartment and a subsequent achievement of a comfortable and stabilized temperature for the passengers with a minimum of adjustments despite changing conditions.

In the drawings, an automobile is depicted at 10 having a conventional engine 12, radiator 14, fan 16 and hose connections 18, 20 for conveying engine coolant to and from a heater core 22. The latter is depicted in FIGS. 4 and 5 as being located on the rear side of a fire wall 24 which separates the engine compartment 25 from the passenger compartment 26.

Conventional defroster nozzles 28 and 30 are provided in the vehicle cowl for directing air upwardly and against the rear side of the windshield. These nozzles communicate by means of flexible conduits 32 and 34 with an air distributor housing 36. The latter is fastened to the fire wall 24 and one end portion thereof encloses the heater core 22. The housing 36 is so formed as to direct air from the heater core, which is on the right side of the vehicle, to the intermediate portion of the vehicle above the transmission tunnel 38. The end of the housing 36 in front of the driver seat is apertured as at 40 to direct air in the vicinity of the driver's feet. The right end of the housing 36 also is provided with a slot 42 for supplying warm air to the corresponding zone of the passenger compartment. Immediately above the tunnel 38 the bottom wall of the housing 36 is cut away as at 44 to cooperate with the fire wall in making an aperture for communication with a Y-shaped duct 46 which leads rearwardly along the top of the tunnel 38 and then divides into two branches 48 and 50. These branches conform with the tunnel and the floor panels in such a way as to define passages for directing heated air beneath the front seat and from slots 49 and 51 toward the back seat passengers. Also located on the underside of the air distributor housing 36 is a series of openings 52 which extends parallel with the opening 44 for directing air downwardly from the housing 36 for deflection from the top surface of the duct 46. It is to be understood that more or fewer openings may be located in the housing 36 as desired properly to distribute air to the front portion of the passenger compartment. A hinged cover 54 is located at an intermediate portion of the rear wall of the housing 36 to provide access to a valve control arrangement 56 located in the housing. The arrangement 56 is shown diagrammatically in the drawings and is somewhat of the type shown in patents such as the United States Patent 2,663,499, granted December 22, 1953, in the name of Arthur J. Schutt, and entitled "Temperature Control Valve." Such an arrangement includes a valve 58 (FIG. 6) controlling a single port 60 and actuated by a plunger 62. This valve controls flow through an elbow connection 64. One branch 66 of the elbow communicates with one end of the hose 18 and the other branch 68 is in alignment with the valve stem 62 and is connected with the heater core 22 to constitute a part of a closed engine coolant circulation system. Interposed between the hose 18 and the branch 68 is a thermosensitive switch 70 (FIGS. 3 and 7) which is adapted to be affected by the temperature of the coolant admitted to the core 22.

The instrument panel 73 of the vehicle body substantially conceals the defroster nozzles and the housing 36 from the view of passengers in the vehicle whereas the duct 46 is of such contour as closely to conform with the tunnel 38 and the vehicle floor. The addition of insulation and carpeting renders the duct 46 and its branches practically unnoticeable. The front seat is not shown in the drawings but it conceals substantial portions of the branches from view.

On the forward side of the fire wall 24 and within the engine compartment 25 on the right side of the vehicle is located a blower 74 and its motor 76. The arrangement of the blower is such as to take air from a cowl chamber at the right side of the vehicle. This chamber is partially defined by the fire wall 24 and is arranged to receive outside air from louvers 78 located in the cowl forwardly of the windshield. Air received from the louvers 78 first passes downwardly and then toward the right side of the vehicle and into the cowl chamber for introduction to the blower. Also located on the forward side of the fire wall 24 is a casing 80 extending from the outlet of the blower 74 toward the center of the car. This housing communicates with an opening 31 (FIG. 5) in the fire wall to direct air to the heater core 22 on the rear side of the fire wall.

The arrangement 56 (shown as a box unit in FIGS. 4 and 5) controlling the water valve 58 includes the gas filled bellows 90 (FIG. 6) and the plunger motor 92. The bellows 90 communicates with one end of a capillary tube 94 which terminates in a coil 96 (FIGS. 4 and 5) located beneath the instrument panel 73 and within the passenger compartment. One end of the bellows 90 is rigidly supported within the arrangement 56 with the other end thereof bearing at 98 against a main lever 100 and the latter is pivoted at 102 to a fixed portion 104 of the arrangement 56. One end of the main lever 100 is connected to one end of a spring 106 and the other end of the spring is adjustably attached by means of a screw 108 to the intermediate portion of a lever 110. One end of the latter is pivoted as at 112 to a fixed support 114 and the other end of the lever bears a roller 116 which rests against a cam member 118. The latter is pivoted at 120 to a portion of the arrangement 56 for rotation by means of an extension 122. This extension may be moved in a rotative direction by means of a lever or Bowden wire to vary the effectiveness of the unified linkage on the valve 58. The roller 116 is held against the cam surface of the cam 118 by means of the spring 106 and the action of the latter also maintains the lever 100 against one end of the gas filled bellows 90. The lever 100 bears two parallel fingers at one end for supporting a pivot pin 124. This pin serves as a pivot at the intermediate portion of a bodily movable lever 126. One end of the latter rests against the plunger 128 of the power element 92 for actuation thereby and the other end of the lever is retained against the end of the valve spindle 62 by means of a spring member 130. The motor or power element 92 is controlled by two thermosensitive devices 132 and 134 which are in the form of coils connected to the power element as shown. Each of these coils is in the form of a capillary tube having ends 136 and 138 operatively connected to the element 92. The coil 132 is supported at the air discharge side of the core 22 whereas the coil 134 is supported at the air inlet side of the core (see FIG. 5).

Figure 3:
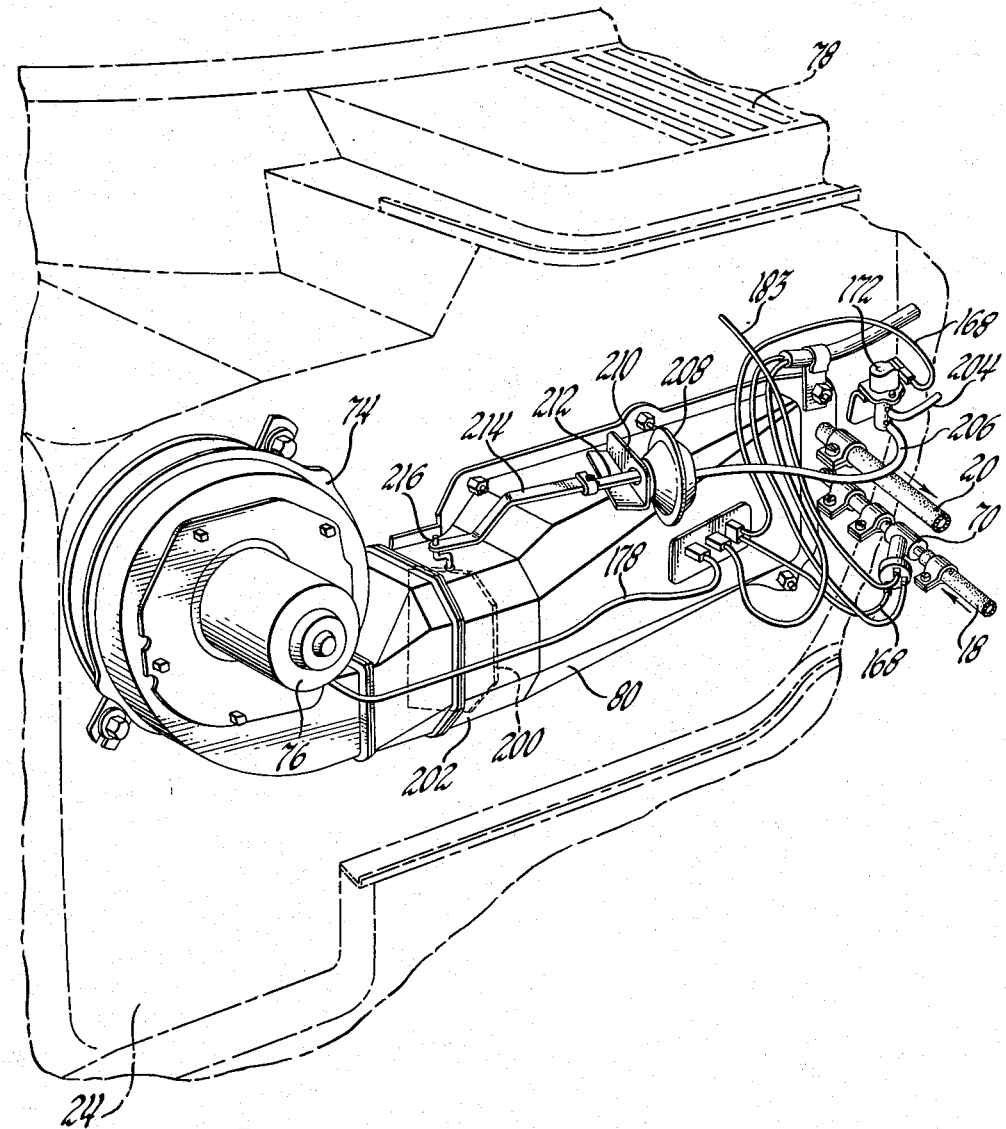
FIG. 3 is a perspective view, in an enlarged scale, of a portion of the heating system as located on the forward side of the vehicle fire wall and indicating the outside contour of the shroud chamber and cowl structure of the vehicle body through which outside air is admitted to the heating system.

The electrical diagram for controlling the blower motor 76 is shown in FIG. 7. That diagram depicts a car battery 140 which is connected to ground at 142. A line 144 leads by way of the ignition switch 146 to a central terminal 148 of a blower control switch 150 conveniently located for operation by the car driver. A terminal 152 of the switch is connected by means of a line 154 to a terminal 156 of the thermoswitch 70. This terminal in turn is connected to a central contact 158 of the thermoswitch 70. Another terminal 160 of the switch 150 is connected by means of a line 162 to a terminal 164 of the thermoswitch 70 and the terminal 164 is connected to a terminal 166 and this latter terminal is connected by means of a line 168 to one end of a solenoid coil 170 which is part of a solenoid vacuum valve 172, the latter being mounted on the forward side of the fire wall (FIGS. 3 and 5). The terminal 166 is also connected by a line 173 to one end of a resistance 174. The other end of the resistance is connected at 176 to a line 178 which connects a terminal 180 of the blower switch 150 with the motor 76. A terminal 182 of the switch 70 is connected by a line 183 to a terminal 184 of a thermoswitch 186. The thermoswitch 186 is shown only in FIG. 7 but it will be understood that this switch is located in the passenger compartment and preferably beneath the instrument panel 73 for actuation by the passenger compartment air. This switch is normally closed and adapted to open when the air temperature in the passenger compartment is at 70° F. and over, i.e.—it is "normally closed" in that it is closed when heating of the passenger compartment either is required or would be required if the vehicle engine is at below operating temperature. One terminal 188 of the thermoswitch 186 is connected by a line 190 to the line 178. Operation of the blower switch 150 is by manual rotation of a contact arm 192 for establishing a suitable connection between the line 144 from the battery and the terminals 152, 160 and 180. The thermoswitch 70 is a normally open type switch located in the heater water line from conduit 18 as seen in FIG. 3 and bears two contacts 194 and 198 which are connected to the terminals 166 and 182 respectively. The arrangement of the thermoswitch 70 is such that contact 194 will close with the contact 158 when the heater water temperature is raised to 100° F. and the contact 198 will close with contact 158 when the temperature reaches 120° F. In other words, the switch 70 is "normally open" until the engine is operated and the temperature of the engine coolant is raised.

The solenoid vacuum valve 172 is provided for controlling the flow of air through the core 22. It does so by cooperation with a valve or damper 200 installed in a portion 202 of the casing 80 as seen in FIG. 3. A tube 204 leads from the engine intake manifold to the vacuum valve 172. Another tube 206 leads from the valve 172 to a vacuum diaphragm type motor 208 supported on the casing 80 by means of a bracket 210. Movement of the diaphragm by introduction of a vacuum effects rotation of the air valve 200 through the use of a diaphragm operated plunger 212 with its extension arm 214 and a crank 216. The crank is fixed to the valve 200. Vacuum diaphragm motors for similar use such as the motor 208 are disclosed in the United States application for Letters Patent Serial No. 610,223, filed September 17, 1956, in the name of Albert D. Baker, and entitled "Automotive Heating, Ventilating and Defrosting Systems."

Figure 2:
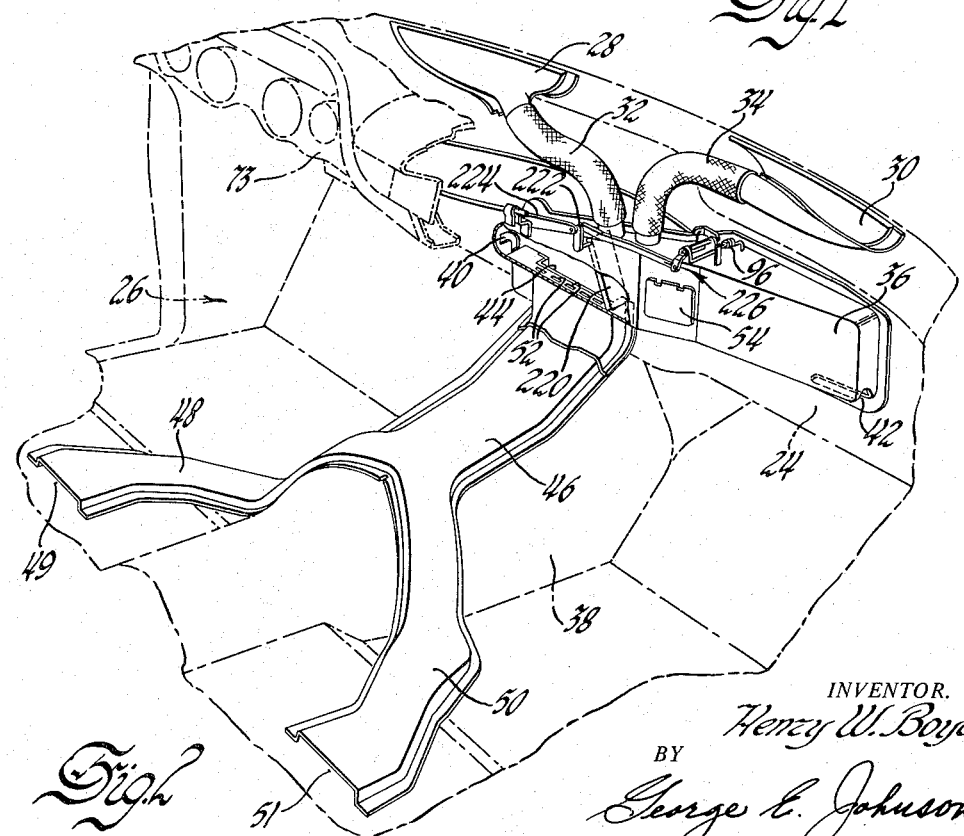
FIG. 2 is a phantom perspective view of portions of the instrument panel, floor and toe board arrangement of the vehicle shown in FIG. 1 with the heating system shown as including a floor duct as a means for distributing heated air.

Another valve 220 (FIG. 2) for controlling air flow to the defroster nozzles 28 and 30 is located in the housing 36 under the conduits 32 and 34. This valve is actuated by a crank 222. This, in turn, may be rotated by a Bowden wire 224 one end of which is so placed as conveniently to be pushed or pulled by the operator with use of a lever not shown. Loose motion connections 226 link the valve crank 222 to the arm or extension 122 (FIG. 6) of the heater valve control arrangement 56 so that when windshield defrosting is called for valves 58 (for engine coolant) and 220 (defroster air) will be opened simultaneously with operation of the blower control switch 150 to give high speed blower performance as will be understood.

The switches 150, 186 and 70 as well as the vacuum valve 172 are conventional and may be purchased in various forms. They are accordingly not described herein in detail as their specific structures form no part of the present invention. The same may be said of the individual power elements 90 and 92 and the thermosensitive devices or coils 96, 132 and 134 whether they be gas filled or wax filled. The combination of these devices and elements in the system as described herein constitutes a novel arrangement which secures optimum passenger comfort with a minimum of adjustment.

In achieving quick warm-up and subsequent optimum comfort control as exemplified by the curves in FIGURE 8, the diagrammatic showings of FIGURES 6 and 7 illustrate the operation, it being understood that all heater air is discharged from the blower 74 and into the passenger compartment by means of the housing 36.

Assuming that the car is cold, the extension 122 of FIGURE 6 is in any position except "off," and the engine is started, the engine coolant valve 58 will be open but the circuit of FIGURE 7 is such that the heater blower motor 76 will not operate. When the engine coolant temperature at the heater core inlet reaches a predetermined point, however, it will cause the contacts 158 and 194 of the switch 70 to close and thereby effect (through the resistor 174) a slow speed operation of the blower 74 and also energizing of the coil 170 to open the air admission valve 200 by engine vacuum. This gives admission of heat at the earliest time possible without flooding the passenger compartment with cold air. At this time, the three sensors 96, 132 and 134 of FIGURE 6 will not serve to close the valve 58.

When the engine coolant temperature rises to a second and higher predetermined temperature, the contacts 158 and 198 will close giving a direct circuit to the motor 76 and the blower 74 will operate at high speed to achieve quick warm-up.

As the car interior temperature arrives at a comfortable level, such level should be automatically controlled to combat varying ambient conditions. This is accomplished in part by the thermoswitch 186. That switch opens and the direct circuit to the blower motor 76 is broken. As a result the blower 74 will again operate at low speed because of the resistance 174. Simultaneously with the reduction in blower speed, the capillary tube 94 of FIG. 6 senses the proper passenger compartment temperature and serves to position the engine coolant valve 58 to cut back or increase the temperature of air being discharged into the passenger compartment.

If the temperature deemed comfortable should be adjusted to suited individual requirements, the extension 122 may be moved about its pivot 120 to change the position of the valve 58. Once the individual need is suited, no readjustment should be necessary as the three tubes 132, 134 and 94 compensate for air temperature variations encountered.

It will be appreciated that the manual blower control switch 150 of FIGURE 7 may be used to override the automatic controls by connecting the arm 192 with the two contacts 160 and 180. This will open the air supply valve 200 and cause the blower 74 to operate at high speed for windshield defrosting or more heat regardless of operating engine coolant temperature or air temperatures.

FIG. 8 of the drawings shows six curves. The lower three curves indicate the air temperatures to which the passengers are subjected with the solid line depicting the results achieved with a 0° F. ambient or outside air temperature. It will be noted that with such ambient temperature a fully stabilized condition is obtained within the passenger compartment after a warm-up period of approximately 24 minutes. It is also to be noted, however, that within only 8 minutes the temperature within the passenger compartment has risen to almost 60° so that it may be seen that an "ice box" atmosphere is quickly dissipated by means of the present invention. The result is due to the air discharge temperature which is quickly raised to over 120° at the warm-up period and then reduced, as time elapses, to a temperature adequate to maintain the stabilized passenger compartment temperature. The dotted line curves represent the results achieved at ambient temperatures of 25° F. and 40° F. The curves illustrate that the controls provided are effective to maintain a desired setting despite large variations in outside temperatures.

I claim:

A heating system for the passenger compartment of a vehicle having a fire wall constituting a front wall of said compartment, said system comprising a multispeed blower and a casing adapted to be mounted on the forward side of a fire wall, a heater core adapted to be mounted at the rear of a fire wall, a housing enclosing said heater core and adapted to guide outside air discharged by said blower and casing into a passenger compartment, valve means arranged to control the flow of engine coolant through said core, a main thermosensitive device adapted to be located in a passenger compartment, a second thermosensitive device in said casing, a third thermosensitive device in said housing in the path of air leading from said core, one power element arranged to be operated by said main thermosetting device, a second power element arranged to be operated by the second and third thermosensitive devices, a bodily movable lever with one end connected to said valve means and the other end being arranged to be actuated by said second power element, an intermediate portion of said bodily movable lever being pivotally connected to one end of a main lever having a fixed pivot, said one power element being arranged to move said main lever about its pivot whereby said first, second and third thermosensitive devices operate said bodily movable lever and said main lever to adjust said valve and thereby control the flow of engine coolant to said core, a damper in said casing for controlling the flow of air from said blower to said core, an electrical system for controlling said blower and damper and including a first thermoswitch adapted to be located in a passenger compartment and a second thermoswitch positioned to be actuated by said coolant, said second thermoswitch being effective at a first high temperature of the coolant to establish one circuit for low speed blower operation and further effective at a second still higher temperature of the coolant to establish a further circuit for high speed blower operation while said first thermoswitch connected in said further circuit is closed, said first thermoswitch being adapted to open after a predetermined temperature of a passenger compartment is attained thereby interrupting said further circuit to return said blower to said one circuit for low speed operation, and the second thermoswitch being normally open to close with a rise of coolant temperature to said first high temperature to open said damper.

References Cited in the file of this patent

UNITED STATES PATENTS

| | | |
|---|---|---|
| 1,890,521 | Mack | Dec. 13, 1932 |
| 2,205,349 | Dube et al. | June 18, 1940 |
| 2,291,543 | Findley | July 28, 1942 |
| 2,586,972 | McKenzie | Feb. 26, 1952 |